United States Patent [19]

Hsiung

[11] 4,062,131
[45] Dec. 13, 1977

[54] INSOLES FOR FOOTWEAR

[75] Inventor: Du Yung Hsiung, Park Forest, Ill.

[73] Assignee: Scholl, Inc., Chicago, Ill.

[21] Appl. No.: 722,127

[22] Filed: Sept. 10, 1976

[51] Int. Cl.² ............................................. A43B 13/38
[52] U.S. Cl. ........................................................... 36/44
[58] Field of Search ........................................ 36/43, 44

[56]            References Cited
        U.S. PATENT DOCUMENTS

| 1,926,283 | 9/1933  | Herbert       | 36/44 |
| 2,061,911 | 11/1926 | Leindorf      | 36/43 |
| 3,842,519 | 10/1974 | Lapidus       | 36/44 |
| 3,852,897 | 12/1974 | Bridge et al. | 36/44 |

FOREIGN PATENT DOCUMENTS

| 168,725 | 9/1921 | United Kingdom | 36/44 |
| 728,075 | 4/1965 | United Kingdom | 36/44 |

Primary Examiner—Alfred R. Guest

Attorney, Agent, or Firm—Hill, Gross, Simpson, Van Santen, Steadman, Chiara & Simpson

[57]            ABSTRACT

An odor absorbing insole or insock covering the inner sole of footwear has a bottom inner sole engaging open cellular resilient cushion layer, an intermediate nonwoven random fiber felt mat porous layer having the fibers coated with an odor and moisture absorbing chemical such as activated charcoal or silica gel, and a porous slippery abrasion resisting top fabric layer protecting the foot or sock of the wearer against discoloration or irritation. The layers of the insole are laminated into integral unitary relation by heat sealing or by binders which do not impede flow of air. The alternating application and release of foot pressure on the insole as when walking will alternately compress and expand the open cellular cushion layer to pump air through intermediate layer and abrasion resisting top layer for circulating air in the footwear around the foot into intimate contact with the chemical for efficient absorption of moisture from foot perspiration and destruction of foot odors.

7 Claims, 5 Drawing Figures

U.S. Patent  Dec. 13, 1977  4,062,131
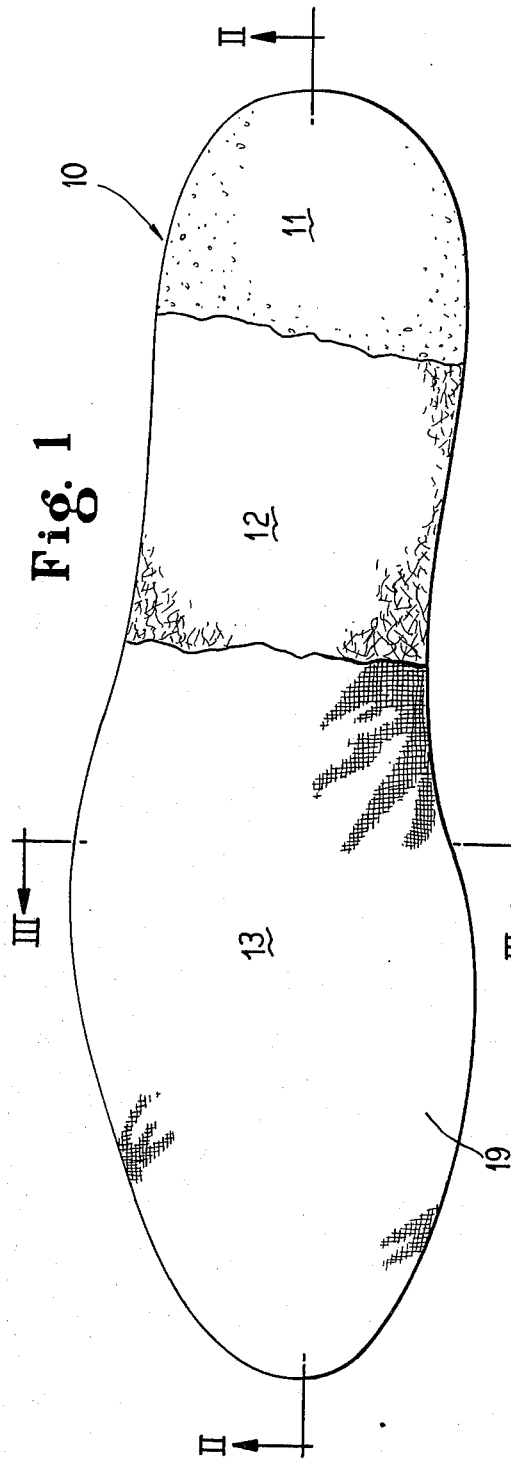
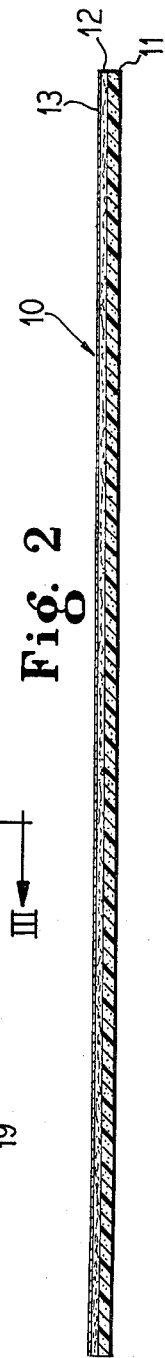
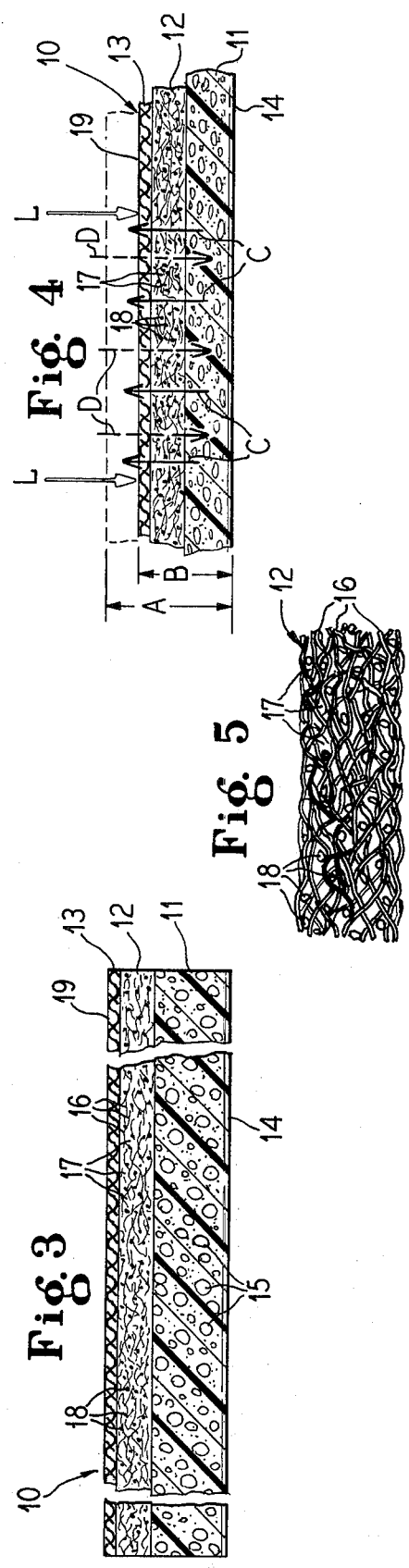

INSOLES FOR FOOTWEAR

FIELD OF THE INVENTION

This invention relates to the art of increasing the comfort of footwear while simultaneously destroying foot odors caused by perspiration and poor ventilation in the footwear. Specifically, the invention relates to multi-layer laminated insoles or insocks shaped and sized to cover the inner soles of footwear and constructed and arranged to cushion the weight of the foot while simultaneously pumping air through odor destroying chemicals embedded in an inner layer of the laminate.

PRIOR ART

Footwear insoles containing deodorants are known in the prior art, for example, in British patent specification No. 728,075, published Apr. 13, 1955, U.S. Pat. No. 3,842,519, issued Oct. 22, 1974, and U.S. Pat. No. 3,852,897, issued Dec. 10, 1974. In the disclosures of these patents, however, the deodorant or odor absorbing chemical is trapped in the cells of foam material such as latex which are sealed off or closed under application of foot pressure or is sealed by binders to prevent efficient intermingling of odor laden air or perspiration with the chemical or has the chemical impregnated layer in direct contact with the foot or sock of a wearer where the chemical can cause discoloration and be absorbed out of the insole into the skin or sock of the wearer leaving the insole in an inactive, worn-out condition after short usage.

SUMMARY OF THIS INVENTION

According to this invention, a multi-layer laminated insole or insock is provided for covering the inner soles of footwear without decreasing the ease of inserting a foot into the footwear while adding a foot cushion and an odor-destroying and perspiration absorbing function to the footwear.

The insoles or insocks of this invention have an open cellular resilient cushion bottom layer, preferably foam plastics material such as polyurethane, natural or synthetic rubber latex and the like open cellular resilient materials. This bottom cushion layer can have a relatively closed pore smooth bottom skin to receive the inner sole of the footwear directly thereagainst preventing buckling and wrinkling therebetween.

The open cellular bottom cushion layer is covered with an odor-destroying and perspiration absorbing nonwoven matted random fiber or felt layer heavily loaded or impregnated with a foot odor destroying chemical such as activated charcoal or silica gel. This felt layer has the porosity and moisture absorbing capacity of blotting paper and because the fiber constituents are unwoven and randomly dispersed they provide a very large surface filter area exposing the chemical particles coated thereon to gases and vapors passing through the layer to destroy the bacteria and soak up the vapors.

The felt layer is covered with a relatively thin woven fabric porous layer presenting a smooth and slippery top surface for the insole which will facilitate insertion of a bare or foot-covering sock into footwear containing the insoles of this invention. The smooth or slippery top layer protects the foot or sock against direct contact with the chemically impregnated felt layer to avoid staining of the foot or sock. This top fabric layer also protects the felt layer against abrasion.

As foot pressure is applied to and relieved from the insoles of this invention during normal use of footwear containing these insoles, the cells of the cushion layer are successively collapsed and expanded creating a pumping action to circulate air and vapors surrounding the foot in the footwear through the porous superimposed layers of the insole. This circulation draws the air and vapors into intimate contact with the myriad of chemically coated fibers in the matted or felt layer to effectively cause the chemicals to act on the odor producing bacterial while the fibers soak up the moisture content of the circulated air and vapors. The chemical impregnated felt layer although porous and absorbent and sufficiently pliable to follow the expansion and contraction of the bottom cushion layer, will not compress to a flattened pore blocking condition under foot pressure so that air passages through the felt layer will be maintained.

The layers of laminated insole of this invention are bonded together by heat sealing or by the use of nonfilm forming binders.

It is then an object of this invention to provide a multi-layer laminated footwear insole with an intermediate fibrous layer impregnated with an odor absorbing chemical, an open cellular bottom layer effective to pump air through the intermediate layer, and a porous abrasion resisting slippery top layer protecting the foot or sock of a wearer against intimate contact with the chemicals in the intermediate layer.

Another object of this invention is provide an odor destroying insole for shoes which protects the foot of a wearer from chemicals in the insole and which pumps air and vapors into intimate contact with the chemicals when foot pressures are applied and relieved from the insole during normal use.

Another object of the invention is to provide a three-layer laminated insole with a bottom layer composed of foam plastics material, an intermediate layer composed of nonwoven cellulous fiber impregnated with activated charcoal or silica gel and a woven fabric porous top layer presenting a slippery abrasion resisting top surface.

Other and further objects of this invention will become apparent to those skilled in this art from the following detailed description of the annexed sheet of drawings, which by way of a preferred example only illustrates one embodiment of this invention.

ON THE DRAWINGS

FIG. 1 is a top plan view, with parts broken away to show underlying layers of an insole according to this invention.

FIG. 2 is a longitudinal cross sectional view taken along the line II—II of FIG. 1.

FIG. 3 is a transverse cross sectional view taken along the line III—III of FIG. 1 but with the thickness of the layers greatly enlarged for clarity.

FIG. 4 is a view similar to FIG. 3 but showing the condition of the layers under foot pressure.

FIG. 5 is a greatly enlarged fragmentary cross sectional view of the chemically impregnated fibrous layer.

AS SHOWN ON THE DRAWINGS

The reference numeral 10 of FIGS. 1 - 4 illustrates a footwear insole according to this invention composed of a bottom layer 11, an intermediate layer 12, and a top layer 13 bonded together to form an integral laminate.

The bottom layer 11 is an open cellular porous plastics foam sheet with a bottom skin 14 presenting a smooth bottom surface which may be less porous than the main body of the sheet. The sheet has a myriad of open pores or cells 15 dispersed uniformly throughout the body thereof. The sheet is resilient and has an uncompressed thickness of about ⅛ inches with acceptable thickness dimensions varying widely from about ⅛ inches to approximately 1/4 inches. The foam sheet is conventionally formed on a smooth surface to provide the smooth skin 14. Polyurethane is a preferred foam plastics material.

The layer 12 is about half the thickness of the layer 11 and may vary from 1/16 to 3/16 inch in thickness. The random fibers 16 constituting the sheet layer 12 are absorbent cellulose fibers of the type used for making paper, cotton, wool and the like. The sheet 12 can be formed on a paper-making machine or other felting machine and may be produced in several superimposed integrated layers built up to form a sheet of the desired thickness. The random fibers 16 are dispersed to provide a very porous absorbent mat with free-flowing air passages 17 therebetween as illustrated in FIG. 5. The fibers 16 are coated with finely dispersed activated charcoal or silica gel particles 18 which may be applied by impregnating the sheet with a liquid suspension of these particles and then dyring the sheet to evaporate the liquid carrier. The particles 18 on the fibers 16 are freely exposed to the open pores or passages 17 between the fibers and, therefore, have an exceptionally extended intimate contact with air passing through the sheet 12.

The top layer or sheet 13 may be very thin in the order of about 1/32 inch thick. The layer 13 is, as explained above, a porous or open weave woven fabric such as cotton scrim, nylon, flannelette or the like. The top surface 19 of this top sheet or layer 13 is smooth and slippery and the sheet is pliable and limp to follow the contour of the underlying sheets or layers.

The sheets 11, 12 and 13 are integrally bonded togther without closing off the pores at the bond areas because of the air pervious character of the bond. Heat sealing and use of nonfilm forming binders are satisfasctory. Latex binders are suitable.

A preferred activated charcoal for impregnating the sheet 12 is sold commercially under the trademark "Darco"manufactured by Atlas Powder Co. of Wilmington, Del. A preferred silica gel for impregnating the sheet 12 is sold under the brand name "Syloid" by Davison Chemical Co., division of W.R. Grace & Co., Baltimore, Md. Syloids 63, 72 and 244 are especially suitable.

When foot loads L are applied to the insole 10, as shown in FIG. 4, the thickness of the insole may be reduced from A to B, but substantially all of this reduction occurs in the thickness of the bottom foam layer 11 which may be compressed to about half of its free state thickness. Air in the pores of the layer 11 is squeezed out of the layer as it is flattened to flow, as shown by the arrows C, through the open passage 17 of the unflattened layer 12 in intimate contact with the chemical particles 18 and then through the pores of the unflattened layer 13. Then when the loads L are released the insole will expand from its B to its A thickness and the air and vapors from the foot area will be drawn back through the layers 13 and 12, as shown by arrows D.

Thus, a pumping action is created causing a circulation of air and vapors in the footwear around the foot of the wearer through the fiber mat layer 12 into repeated intimate contact with the odor absorbing chemical. The foot odor bacteria are neutralized and the foot perspiration is dried.

From the above descriptions, it will, therefore, be understood that this invention provides an insole for footwear composed of at least three layers, including a bottom open cellular cushion layer, a random fiber intermediate having absorbent fibers coated with absorbent chemicals which will absorb moisture and neutralized bacteria causing foot odors and a smooth slippery porous top layer. The layers are arranged so that foot pressure applied to and removed from the insole will effect a pumping of air through the porous intermediate layer to bring the air into intimate extensive contact with the chemical for efficient absorption of moisture and odors.

I claim as my invention:

1. An insole for footwear which comprises a multilayer laminate shaped to overlie the inner sole of footwear and composed of a bottom open cellular resilient plastics sheet with a relatively closed pore smooth bottom skin for resting on the inner sole of the footwear, an intermediate porous sheet of randomly disposed fibers impregnated with a moisture-absorbing and foot-odor absorbing chemical freely exposed on the fibers, a top porous woven fabric sheet presenting a slippery abrasion resisting top surface, and air pervious bonding means uniting the bottom sheet to the intermediate porous sheet and the intermediate porous sheet to the top porous woven fabric sheet without closing the pores at the bond areas so that said bottom sheet alternately flattens and expands upon application and release of foot pressure on the insole to pump air and vapor in the footwear through the intermediate sheet in intimate contact with the chemical for absorption of moisture and foot odors.

2. The insole of claim 1 wherein the chemical is selected from the group consisting of activated charcoal and silica gel.

3. The insole of claim 1 wherein the bottom layer is composed of foam plastics material.

4. The insole of claim 1 wherein the bottom layer is relatively thick, the intermediate layer is about half the thickness of the bottom layer and the top layer is a thin woven porous fabric.

5. A foot odor absorbing cushion insole for footwear comprising a laminate shaped to cover the inner sole of a shoe having a bottom open cell resilient foam plastics material layer with a smooth non-porous bottom surface, a random fiber porous mat center layer and a porous slippery woven fabric top layer, an odor absorbing chemical freely exposed on the fibers of said center layer, and air porous bonds uniting said layers so that said bottom layer when flattened under foot load expels air from the cells thereof and said center layer remains relatively incompressible under foot load to receive the expelled air from the bottom layer in intimate contact with said chemical for absorption of odors from the air.

6. The insole of claim 5 wherein the odor absorbing chemical is selected from the group consisting of activated charcoal and silica gel.

7. The insole of claim 5 wherein the bottom layer has an uncompressed thickness from about 1/16 to approximately ¼ inch, the center layer has a thickness from about 1/16 to 3/16 inch and the top layer has a thickness of about 1/32 inch.

* * * * *